(12) United States Patent
Hackl

(10) Patent No.: US 9,044,893 B2
(45) Date of Patent: Jun. 2, 2015

(54) METHOD AND DEVICE FOR SAVING ENERGY IN EXTRUSION

(75) Inventor: Leopold Hackl, Katzelsdorf (AT)

(73) Assignee: Battenfeld-Cincinnati Austria GmbH, Vienna (AT)

( * ) Notice: Subject to any disclaimer, the term of this patent is extended or adjusted under 35 U.S.C. 154(b) by 820 days.

(21) Appl. No.: 12/671,957

(22) PCT Filed: Jun. 16, 2008

(86) PCT No.: PCT/EP2008/057532
§ 371 (c)(1),
(2), (4) Date: Jun. 25, 2010

(87) PCT Pub. No.: WO2009/024368
PCT Pub. Date: Feb. 26, 2009

(65) Prior Publication Data
US 2011/0187019 A1 Aug. 4, 2011

(30) Foreign Application Priority Data
Aug. 23, 2007 (DE) .......................... 10 2007 039 799

(51) Int. Cl.
*B29C 71/00* (2006.01)
*B29C 47/88* (2006.01)
*B29C 47/00* (2006.01)
*B29C 47/08* (2006.01)

(52) U.S. Cl.
CPC ............. *B29C 47/88* (2013.01); *B29C 47/0023* (2013.01); *B29C 47/0893* (2013.01)

(58) Field of Classification Search
USPC ........... 264/234, 1.29, 3.3, 13, 433, 452, 464, 264/467, 37.26, 37.32, 45.9, 623, 634, 638, 264/75, 514, 539, 540, 141, 142, 148–151, 264/171.11, 171.21, 173.12, 173.16, 176.1, 264/177.17, 209.6, 209.7, 211.1, 211.21, 264/211.23, 211.24, 920
See application file for complete search history.

(56) References Cited

U.S. PATENT DOCUMENTS 2,988,280 A * 6/1961 Kimm et al. .................. 236/34.5
3,601,858 A * 8/1971 Blanchard ....................... 425/86
(Continued)

FOREIGN PATENT DOCUMENTS

| DE | 3037441 A1 | 5/1982 |
| DE | 3815298 A1 | 11/1989 |
| EP | 1308261 A1 | 5/2003 |

(Continued)

OTHER PUBLICATIONS

Sonntag, R., "Rationelle Waermerueckgewinnung an Kunststoff-Verarbeitungsmaschinen," Kunststoffe, Carl Hanser, Verlag, Muchen, *Kunststoffe*, 94(9):496-498 (Sep. 1984).
International Search Report of PCT/EP2008/057532, dated Oct. 30, 2008, 3 pages.

*Primary Examiner* — Stella Yi
(74) *Attorney, Agent, or Firm* — Hamilton, Brook, Smith & Reynolds, P.C.

(57) ABSTRACT

The invention relates to a method for saving energy in an extrusion line comprising at least one extruder, an extrusion tool, a cooling section, and an outlet, energy being applied in the form of heat to a plastic for plasticization at least in the extruder, in order to produce a profile (8), and the heat being removed again from the profile (8) after a forming process, at least in the cooling section, in order to achieve shape stability of the same. According to the invention, at least one part of the removed heat is converted to mechanical energy and fed back into the extrusion process. The invention further relates to a corresponding device.

4 Claims, 3 Drawing Sheets

(56) References Cited

U.S. PATENT DOCUMENTS

Figure 1:
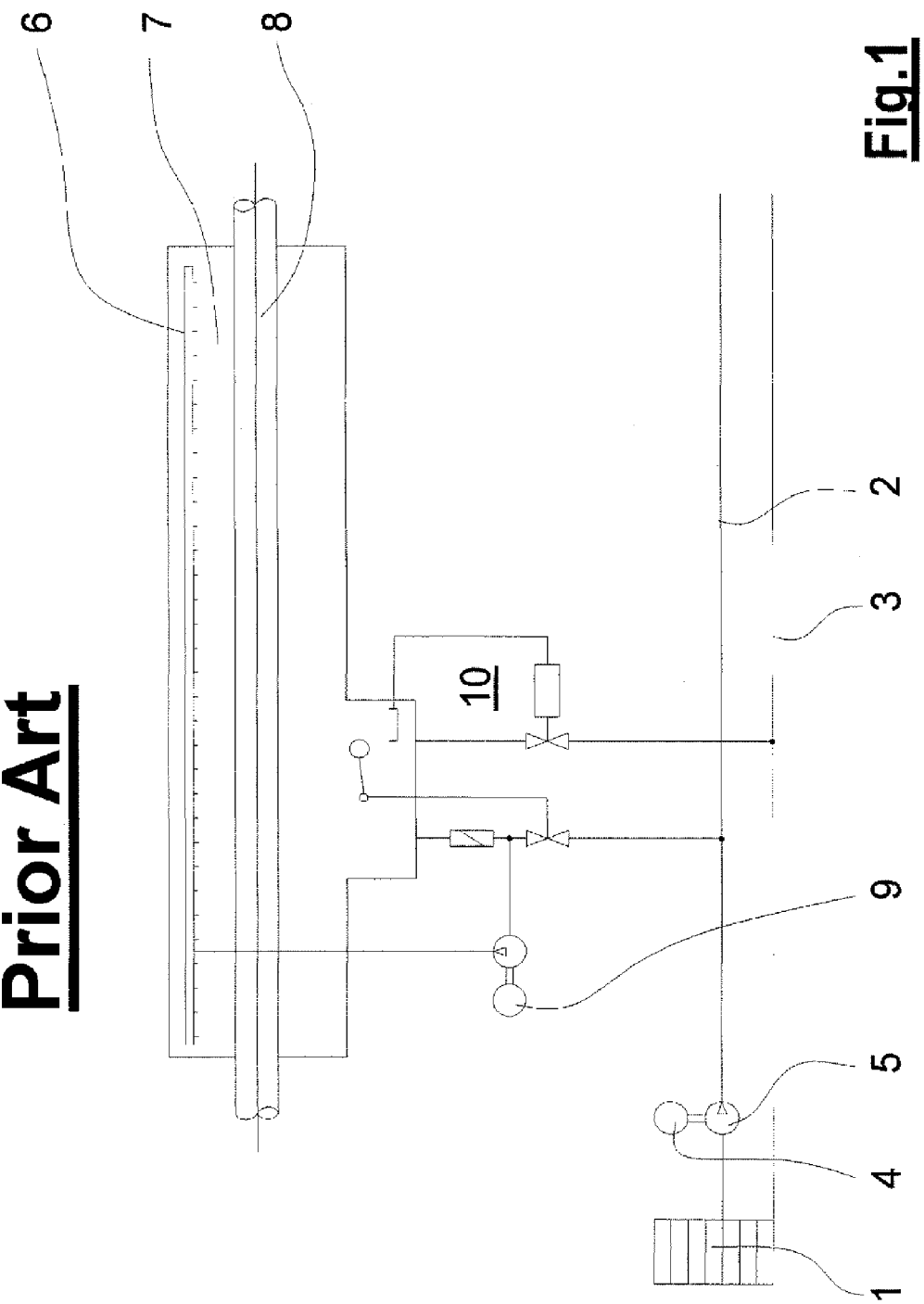

| | | | |
|---|---|---|---|
| 4,511,805 A * | 4/1985 | Boy-Marcotte et al. | 290/2 |
| 6,755,640 B2 | 6/2004 | Bauer et al. | |
| 2006/0288699 A1 | 12/2006 | Corbett, Jr. | |
| 2007/0001339 A1 * | 1/2007 | Garcia | 264/142 |

FOREIGN PATENT DOCUMENTS

| | | | |
|---|---|---|---|
| JP | 2000246786 | * | 9/2000 |
| JP | 2000246786 A | | 9/2000 |
| JP | 2000642067 | | 9/2000 |
| WO | WO 2006/060837 A1 | | 6/2006 |

* cited by examiner

METHOD AND DEVICE FOR SAVING ENERGY IN EXTRUSION

This application is the U.S. National Stage of International Application No. PCT/EP2008/057532, filed Jun. 16, 2008, which designates the U.S., published in German, and claims priority under 35 U.S.C. §§119 or 365(c) to German Application No. DE 10 2007 039 799.4, filed Aug. 23, 2007.

The invention relates to a method for saving energy in an extrusion line which comprises at least one extruder, an extrusion die, a cooling section and a take-off unit, wherein energy in the form of heat is introduced into a plastic at least into the extruder for plasticization in order to produce a profile, and, after a shaping process, heat is extracted again from the profile at least in the cooling section in order to achieve dimensional stability.

The invention also relates to an apparatus in this respect.

In plastics processing, it is known to melt the plastic through the use of primary energy (electrical power, natural gas, etc.) and conversion of this energy into frictional heat or heat for heating purposes. The plastic melted in this way is injected into a mold (injection molding) or, as in extrusion, is forced through a die and cooled intensively in order to achieve dimensional stability. This is termed frosting of the plastic. During this intensive cooling, waste heat is produced, e.g. hot air in blown film extrusion, hot water in pipe extrusion or else in injection molding. This waste heat has scarcely been used hitherto. It is dissipated to the environment via chillers or cooling towers and is therefore lost.

Fans or blowers and circulating pumps are used for conveying the cooling media such as air and water. These blowers and circulating pumps are driven via an electric motor. In a pipe factory, there is normally a closed water cooling circuit, via which the water is brought by means of a pump to the individual consumers, such as cooling baths, transmission cooling, etc. The cooling baths have a separate circulating pump which keeps on bringing the water to the plastic product to be cooled. The water temperature is kept constant via a thermostat. Other consumers driven by electric motors are, for example, vacuum pumps. In profile extrusion, a plurality of vacuum pumps are installed in a line.

The problem addressed by the invention is to offer a method and an apparatus, by means of which heat extracted from the plastic product produced can be beneficially utilized in the process and therefore the entire plant can be operated in an energy-saving manner. Global environmental heating is therefore minimized.

The solution to the problem in relation to the method is characterized in conjunction with the preamble of claim 1 in that at least some of the extracted heat is converted into mechanical energy and fed back to the extrusion process.

According to a development, the mechanical energy generated is used for operating the devices incorporated in the extrusion process, such as, for example, the circulating pumps and/or fans and/or blowers, but also the vacuum pumps.

Alternatively, provision is made for the mechanical energy to be converted into electrical energy and fed back into the network of the energy supplier. It is also conceivable for at least some of the electrical energy to be used in-house. Considered here is the operation of small energy consumers such as emergency lighting. The storage of the energy in accumulators is equally possible.

The solution with regard to the apparatus is characterized in conjunction with the preamble of claim 5 in that a heat engine is assigned to at least the cooling section, by means of which heat engine a quantity of heat extracted from the process can be converted into mechanical energy.

According to a development, it is proposed here that the heat engine used be a Stirling engine which comprises at least one machine incorporated in the extrusion process, such as circulating pumps and/or fans and/or blowers and/or vacuum pumps.

With the method and apparatus proposed according to the invention, an energy circuit, by means of which energy introduced for melting the plastics granules is fed back at least partly to the process, is proposed for the first time in extrusion, that is to say also in plastics processing.

Figure 2:
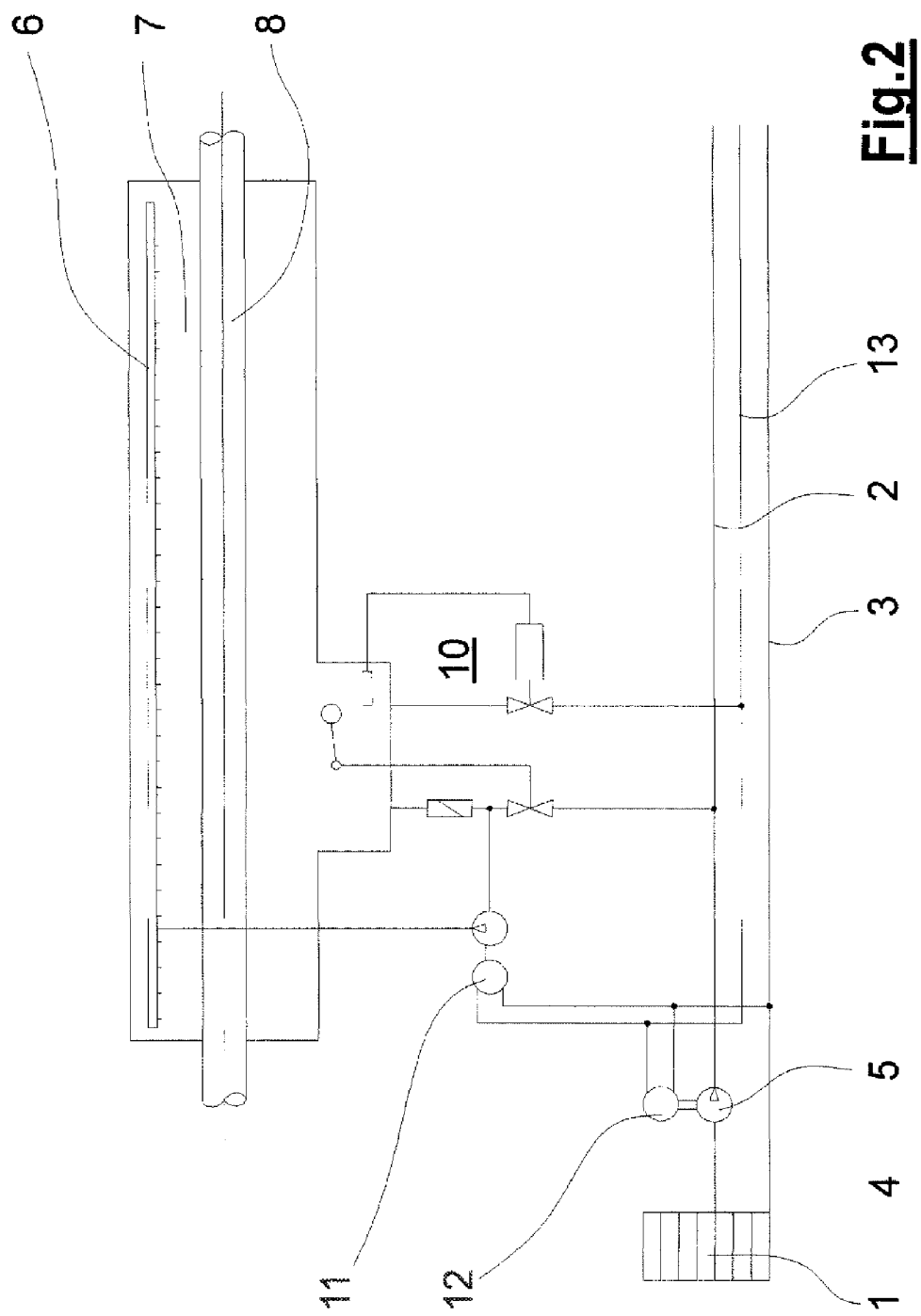
Figure 3:
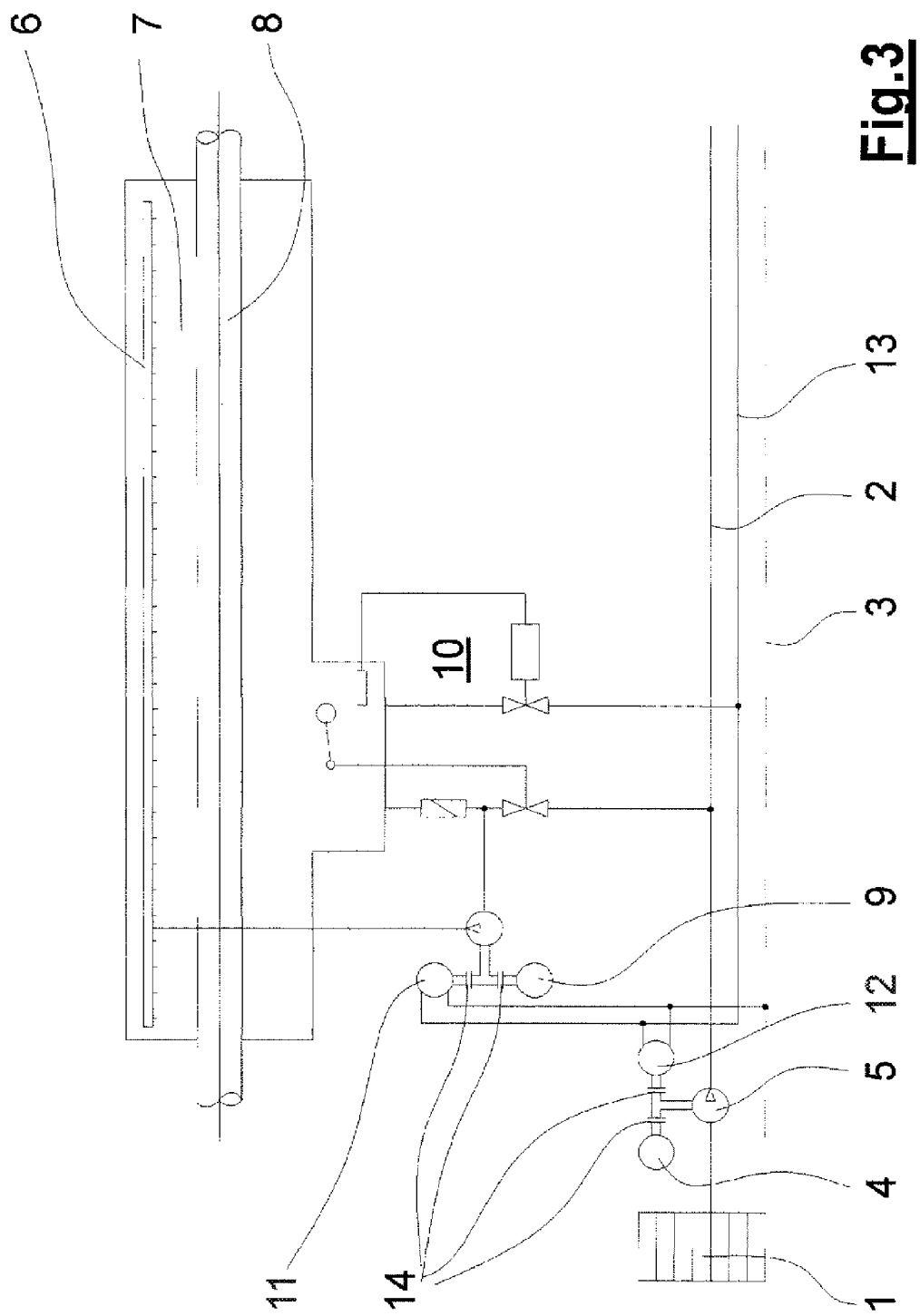

An exemplary embodiment of the invention is schematically reproduced in the drawings, in which:

FIG. 1 shows the prior art,
FIG. 2 shows a plant scheme with available sufficient hot water supply, and
FIG. 3 shows a plant scheme without hot water supply.

Shown schematically in FIG. 1 is a system as is normally available nowadays in extrusion halls. The bottom part of the figure shows a conventional hall installation in which a cooling tower 1 is connected to a feed 2 and a return 3. A first electric motor 4 actuates a pump 5 which connects the water to each extrusion plant via corresponding supply conduits. Such a scheme is shown in the top part of FIG. 1. The supply conduit of the feed of the hall installation is connected to a distributing pipe having spray nozzles 6, via which the water is directed for cooling the plastic pipe 8 in a cooling bath 7. The circulating pump together with electric motor 9 is responsible for the requisite delivery of the cooling water. A corresponding thermostatic valve 10 controls the temperature of the water in the circuit. For example, if a target temperature is exceeded, water is delivered from the collecting basin into the hall return and similarly fresh, colder water is brought into the circuit from the hall feed.

FIG. 2 now shows the construction according to the invention, in which the pipe cooling using the distributing pipe with spray nozzles 6 and the plastic pipe 8 is again used. It substantially corresponds to the construction in FIG. 1. The crucial difference, however, lies in the fact that the hot water flowing off via the thermostatic control feeds the hot water circuit 13 (and does not flow into the return conduit 3) and that the electric motors 5 and 9 used have now been replaced by heat engines 11 and 12. These two heat engines drive the respective pumps and are connected to the hall return 3 and a further hot water circuit conduit 13 and thus utilize the temperature gradient between these two conduit systems, the energy generation of which is sufficient to drive at least the pumps in the circuit.

If there is still no hot water in the circuit (e.g. Monday morning, all lines are stopped, and there is then no hot waste water, although the hot water circuit exists), but the first line has to be started, systems as shown in FIG. 3 are used.

The pumps of this line are equipped with electric motors, and, if the line runs for long enough and sufficiently hot waste water is available, the operation can be switched over to the heat engines. The pumps can therefore be driven both via the electric motors 9 and 4 and via the heat engines 11 and 12. Corresponding couplings 14 control the supply of energy to the pumps. It is therefore possible via such a configuration to first of all start up the circuit via the electric motors 9 and 4 and, when there is an adequate temperature in the hot water circuit, to then start up the heat engines 11 and 12 and finally to switch over the drive of the pumps from the electric motors to the heat engines.

Due to this configuration according to the invention, it is possible to reduce the number of the power-consuming devices in an energy circuit and even replace them completely.

LIST OF DESIGNATIONS

1 Cooling tower
2 Hall feed
3 Hall return
4 Electric motor
5 Pump
6 Distributing pipe with spray nozzles
7 Cooling bath
8 Plastic pipe
9 Electric motor
10 Thermostatic valve
11 Heat engine 1
12 Heat engine 2
13 Hot water cooling conduit
14 Coupling

The invention claimed is:

1. A method for saving energy in an extrusion line which comprises at least one extruder, an extrusion die, a cooling section and a take-off unit,
wherein energy in the form of heat is introduced into a plastic in the at least one extruder for plasticization in order to produce a profile, and
after a shaping process, heat is extracted from the profile at least in the cooling section with cooling water that cools the profile in order to achieve dimensional stability, the cooling section having a reservoir that feeds heated cooling water that has been heated by the profile to a hot water circuit conduit of a hot water circuit, a cooling tower being connected to a return conduit of the hot water circuit for cooling the heated cooling water received from the return conduit of the hot water circuit and returning cooled cooling water to the cooling section through a feed for cooling the profile, the temperature of the water in the reservoir being controlled by a thermostatic valve connected between the reservoir and the hot water circuit which delivers heated cooling water from the reservoir to the hot water circuit conduit when a target temperature is exceeded, and brings in cooled cooling water from the feed,
at least some of the extracted heat is converted into mechanical energy and fed back to the extrusion process by thermally connecting with at least one heat engine to and between the hot water circuit conduit and the return conduit of the hot water circuit, and utilizing a temperature gradient between the hot water circuit conduit and the return conduit of the hot water circuit for operation, the water being heated only at the cooling section, the at least one heat engine for driving a pump for spraying cooling water on the profile in the cooling section.

2. The method as claimed in claim 1 in which the mechanical energy is used for operating circulating pumps and/or fans and/or blowers and/or vacuum pumps incorporated in the extrusion process.

3. The method as claimed in claim 1 in which mechanical energy generated is converted into electrical energy.

4. The method as claimed in claim 3 in which the electrical energy is fed back into an energy network.

\* \* \* \* \*